(12) United States Patent  
Saito

(10) Patent No.: US 6,612,589 B2  
(45) Date of Patent: Sep. 2, 2003

(54) HOLDING DEVICE

(75) Inventor: Fuminori Saito, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/099,979

(22) Filed: Mar. 19, 2002

(65) Prior Publication Data

US 2003/0102640 A1 Jun. 5, 2003

(30) Foreign Application Priority Data

Nov. 30, 2001 (JP) ........................................ 2001-366408

(51) Int. Cl.$^7$ .............................................. B23B 31/16
(52) U.S. Cl. ........................ 279/110; 279/123; 294/902; 901/39
(58) Field of Search ................................ 279/123, 110; 294/119.1, 902; 901/31, 39; 268/258

(56) References Cited

U.S. PATENT DOCUMENTS

| | | | | | |
|---|---|---|---|---|---|
| 4,650,237 A | * | 3/1987 | Lessway | ...................... | 294/902 |
| 4,653,793 A | * | 3/1987 | Guinot et al. | ................ | 294/902 |
| 4,767,110 A | * | 8/1988 | Yang | ............................ | 269/258 |
| 4,828,276 A | * | 5/1989 | Link et al. | ................... | 279/110 |
| 5,120,101 A | * | 6/1992 | Vranish | ....................... | 294/902 |
| 5,215,507 A | * | 6/1993 | Bonig | .......................... | 901/39 |
| 5,556,085 A | * | 9/1996 | Cyr | ............................. | 279/110 |

FOREIGN PATENT DOCUMENTS

| | | | | | |
|---|---|---|---|---|---|
| JP | 403026485 A | * | 2/1991 | ................. | 294/902 |
| JP | 411188683 A | * | 7/1999 | ............ | B25J/15/08 |

* cited by examiner

Primary Examiner—Steven C. Bishop  
(74) Attorney, Agent, or Firm—Oblon, Spivak, McClelland, Maier & Neustadt, P.C.

(57) ABSTRACT

A holding device includes a support frame; multiple pairs of holding fixtures mounted on the support frame; a holding fixture pulley attached to one holding fixture of each one pair of holding fixtures; at least one frame pulley attached to the support frame; a drive rope bridging between the holding fixture pulley and the frame pulley and having one end pulled in one direction and the other end fixed to the support frame; and a drive source that pulls the drive rope. With this configuration, when the drive rope is pulled by the drive source, holding fixtures constituting each one pair of holding fixtures are linked to move symmetrically to each other in a direction that holds an object to be held, each one pair of holding fixtures move independently of other pairs of holding fixtures, and the holding fixtures of each one pair of holding fixtures are movable toward and away from each other on a straight line or on two parallel straight lines on a plane of the support frame. The multiple pairs of holding fixtures have contact parts that contact the object when the object is being held, and at least one of the contact parts is disposed so that it is rotatable about an axis parallel to a line normal to the plane of the support frame to maintain a rolling contact with the object when holding the object.

4 Claims, 8 Drawing Sheets

HOLDING DEVICE

BACKGROUND OF THE INVENTION

1. Field of the Invention

This invention relates to a holding device of industrial robots, helper robots, home-use robots and other robots, or of conveyance equipment, automated devices, etc. in various manufacturing processes, that holds various types of workpieces, articles of daily use such as cups, or other objects.

2. Description of the Prior Art

Prior art industrial robot holding devices include holding devices such as that disclosed in the JP-A HEI 4-159092 and shown in FIG. 1 and FIG. 2. This device is equipped with holding claws 2 (2a to 2c) having detectors 8 and auxiliary claws 6 that hold an object 9 and are operated in sync via a piston 7 by air cylinders 5 (5a to 5c) mounted on a base 1 and by links 3 (3a to 3c) and a rotational disc 4. This kind of prior-art holding device is equipped with air cylinders or other drive devices for multiple holding claws, thus making the mechanism complex In addition, holding devices that drive via a pulley by means of a rope are disclosed in JP-A SHO 52-91266 and JU-A SHO 61-64985, but these use only one pair of holding fixtures and their mechanism is complex because they use many pulleys, gears, etc.

The inventor has already proposed as a previous invention (JP-A HEI 11-188683) a holding device equipped with a mechanism that employs a single drive source, such as a motor etc., to drive the holding fixtures of the holding device and is simple in structure, lightweight and compact. In addition, this mechanism utilizes a single rope to transfer the driving force to the holding fixtures and give equal holding force to all of the multiple holding fixtures regardless of the shape of an object being held, thereby holding the object precisely and stably and preventing damage given to the held objects due to unequal holding forces.

In the previous invention, however, due to frictional force between the holding fixtures and the object when tension is applied to the drive rope, the holding operation will stop before a sufficiently stable holding condition can be achieved. When an external force is exerted in such an unstable holding condition or when the tension on the drive rope is increased for further increasing the holding force to achieve a more stable holding condition, slip will occur between the object and the holding fixtures, thus causing a temporary unstable holding condition to occur and resulting in the held object falling or other problems.

This invention has been proposed to solve the problems of the previous invention, and its purpose is to offer a holding device that utilizes rolling contact between the holding fixtures and the object being held to prevent slip from occurring between the holding fixtures and the held object and achieve a smooth transition to a stable holding condition.

SUMMARY OF THE INVENTION

The holding device of this invention comprises a support frame; multiple pairs of holding fixtures mounted on the support frame; a holding fixture pulley attached to one holding fixture of each one pair of holding fixtures; at least one frame pulley attached to the support frame; a drive rope bridging between the holding fixture pulley and the frame pulley and having one end pulled in one direction and the other end fixed to the support frame; and a drive source that pulls the drive rope; whereby when the drive rope is pulled by the drive source, holding fixtures constituting each one pair of holding fixtures are linked to move symmetrically to each other in a direction that holds an object to be held, each one pair of holding fixtures move independently of other pairs of holding fixtures, and the holding fixtures of each one pair of holding fixtures are movable toward and away from each other on a straight line or on two parallel straight lines on a plane of the support frame; wherein the multiple pairs of holding fixtures have contact parts that contact the object when the object is being held, and at least one of the contact parts is disposed so that it is rotatable about an axis parallel to a line normal to the plane of the support frame to maintain a rolling contact with the object when holding the object.

In a preferred aspect of the invention, the holding device further comprises a braking means that constrains or applies resistance to the rotation of the contact part.

As described above, at least one of the contact parts of the holding fixtures is disposed such that it can rotate to maintain rolling contact with the object to be held, whereby slip occurring between the object and the holding fixtures during the holding operation is reduced to achieve a transition to a stable holding condition.

Further, by equipping the holding fixture with a breaking means for braking the rotation of the contact part, stable constraining of the object to be held can be continued after complete holding of the object, thus making it possible to precisely control the holding operation according to the type or attributes of the object to be held.

The above and other objects and features of the invention will become apparent from the following description made with reference to the accompanying drawings.

BRIEF EXPLANATION OF THE DRAWINGS

FIG. 3(*b*) is a diagram for explaining the basic principle of a holding fixture drive mechanism.

FIG. 4(*b*) is a diagram showing a round object being held.

FIG. 4(*c*) is a diagram showing a long rectangular object being held.

FIG. 4(*d*) is a diagram showing a triangular object being held.

FIG. 9(*b*) is a diagram for explaining the condition wherein the braking means in FIG. 8 has enabled rotation of the contact part.

DESCRIPTION OF THE PREFERRED EMBODIMENT

Figure 1:
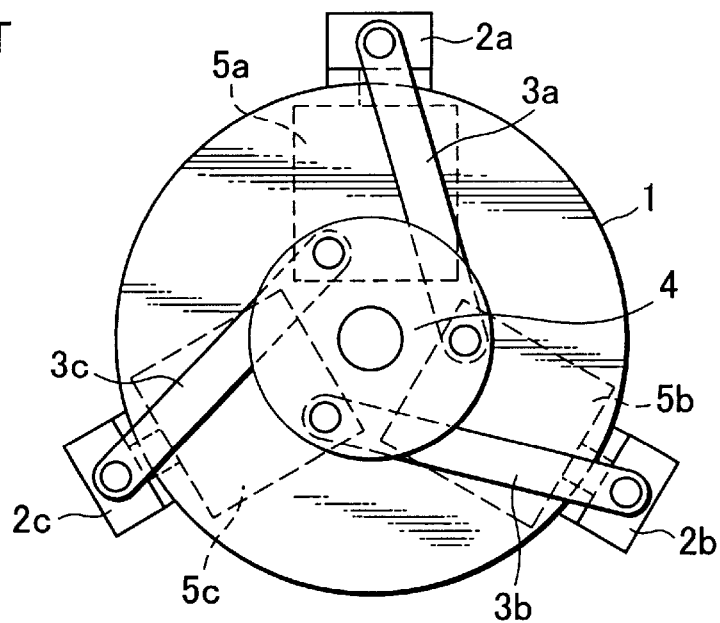
FIG. 1 is a plan view showing a prior art holding device.
Figure 2:
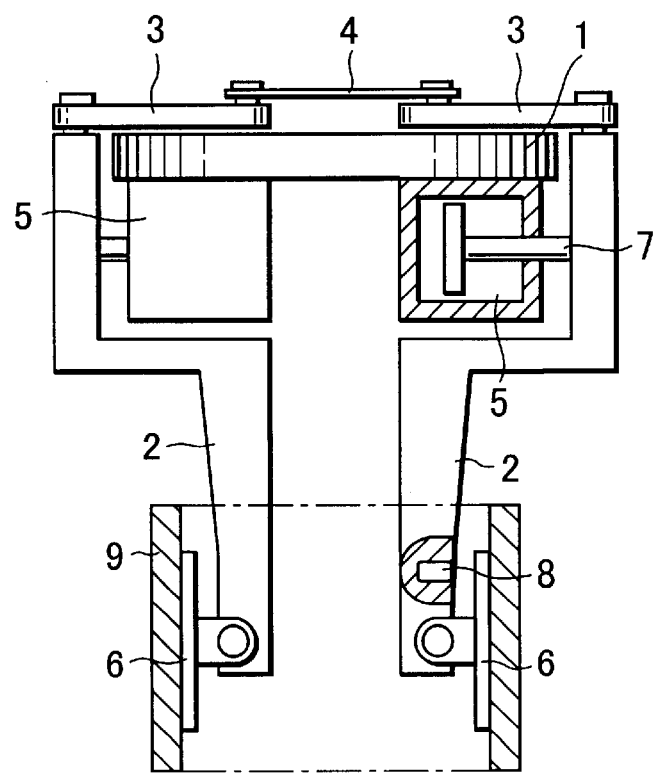
FIG. 2 is a front view showing a cross section of part of the holding device in FIG. 1.
Figure 3A:
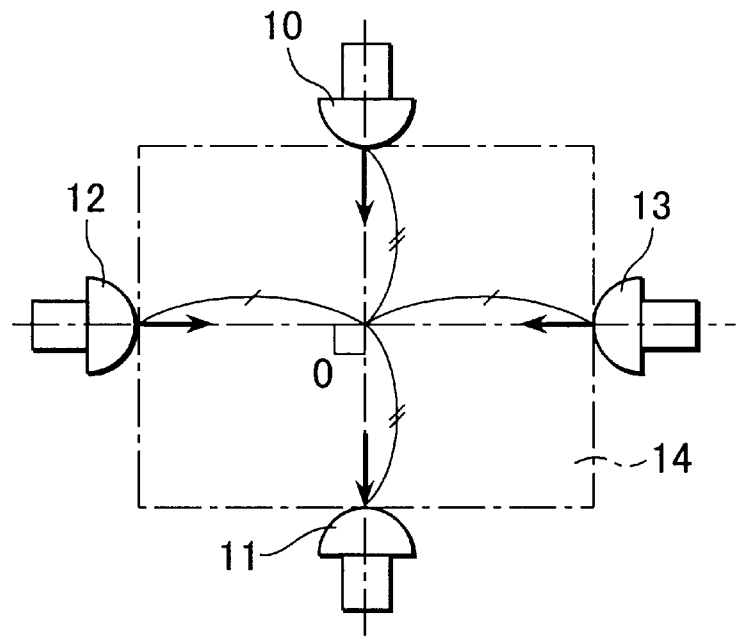
FIG. 3(*a*) is a diagram showing symmetry of two pairs of holding fixtures about center 0.
Figure 3B:
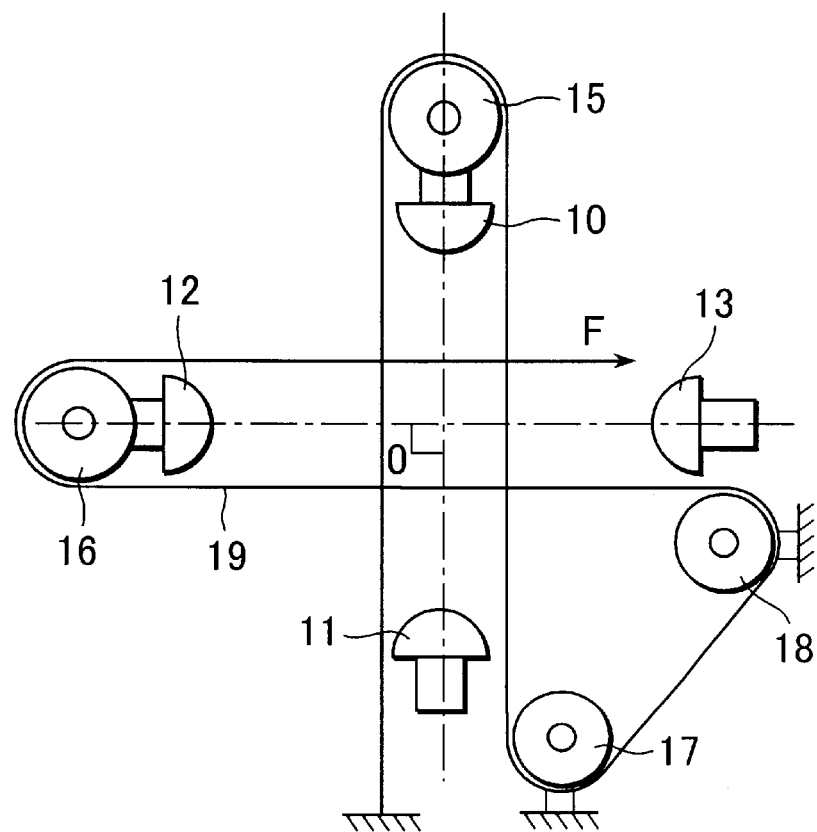
Figure 4A:
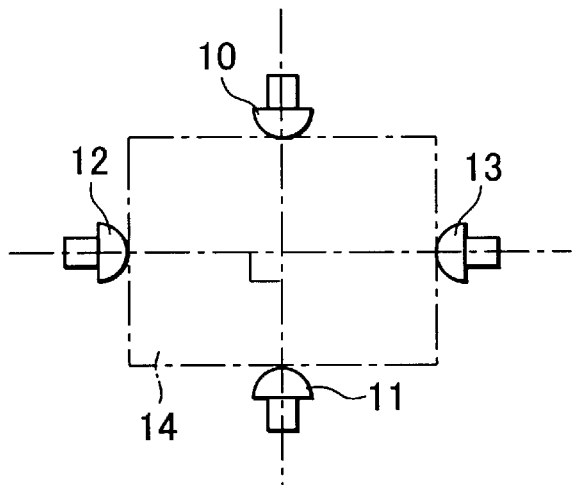
FIG. 4(*a*) is a diagram showing a rectangular object being held.
Figure 4B:
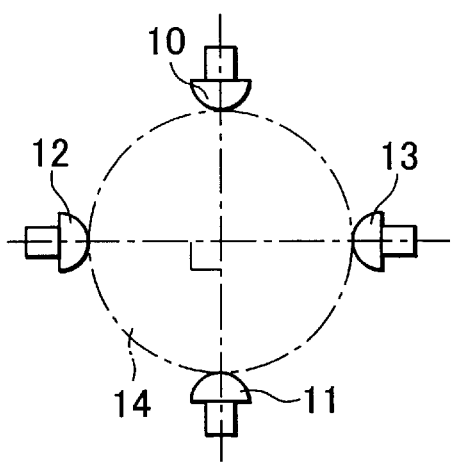
Figure 4C:
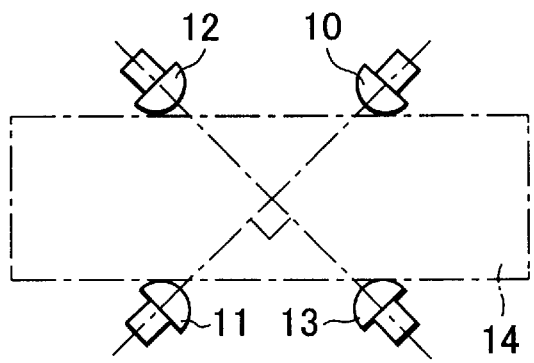
Figure 4D:
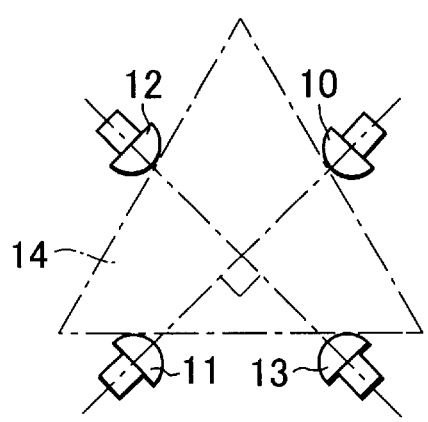
Figure 5:
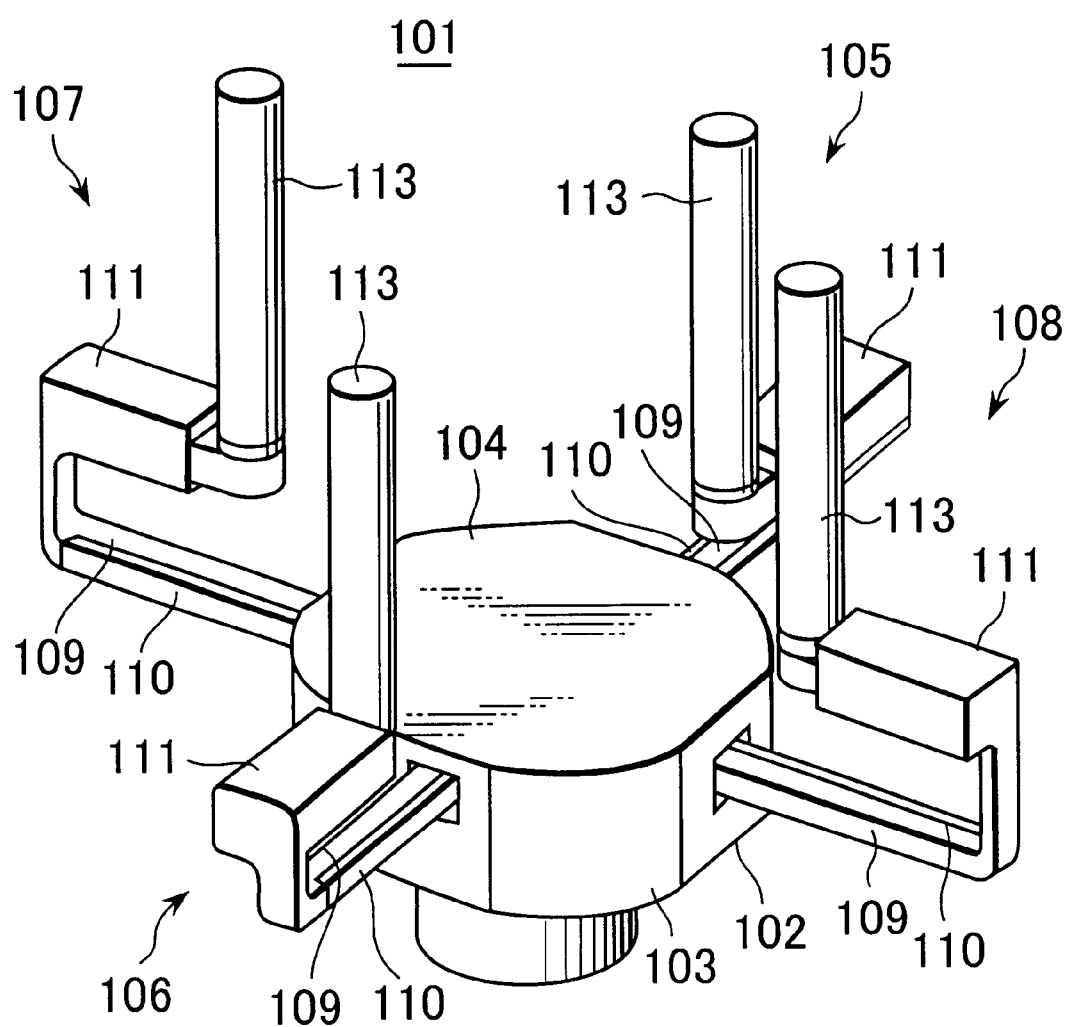
FIG. 5 is a perspective view showing an embodiment of the holding device of this invention.

FIG. 3 and FIG. 4 are schematic diagrams that explain the basic concept of a holding mechanism upon which this invention is premised. In FIG. 3(b), a mechanism is provided that links two pairs of holding fixtures 10, 11 and 12, 13 to move each one pair independently of the other one pair, with a holding center O as a symmetric center, when an object 14 to be held is held by the two pairs of holding fixtures 10, 11 and 12, 13.

In FIG. 3(a), the two pairs of holding fixtures 10, 11 and 12, 13 are mounted on a base (support frame) not shown so that the holding fixtures of each one pair can move toward and away from each other. As shown in FIG. 3(b), one of the holding fixtures 10 (12) of each one pair is equipped with a holding fixture pulley 15 (16).

Further, the base is equipped with frame pulleys 17, 18. A rope 19 is passed through these pulleys 15 to 18, and one end thereof can be pulled in the direction of arrow F while the other end thereof is attached to the base, as shown in FIG. 3(b). When one end of the rope 19 is pulled in the direction of arrow F, the holding fixture pulleys 15, 16 are moved toward the center by the rope 19, which in turn moves the holding fixtures 11, 13 toward the center, thus resulting in the object to be held being held by the two pairs of holding fixtures 10, 11 and 12, 13.

By means of this principle, rectangular, round, long rectangular, triangular and other shaped objects can be held uniformly, precisely and stably by the two pair of holding fixtures as shown in FIG. 4(a) to FIG. 4(d).

The holding device 101 of this invention is premised on the holding mechanism based on the basic principle described above, and its embodiment is explained in FIG. 5 to FIG. 10. The holding device 101 has a base (support frame) 102. The holding device 101 is mounted onto the end etc. of a movable member of a robot or other automated device. A flange 103 is formed around the base 102. The top is closed off with a lid 104.

Two pairs of holding fixtures 105, 106 and 107, 108 are disposed on the base 102 such that they radiate out from the center of the base. The two pairs of holding fixtures 105, 106 and 107, 108 are each equipped with a support rod 109, a rail 110 affixed to the support rod 109 along the length of the support rod 109, and a holding rod 111 disposed such that it extends from the outside end of the support rod 109 toward the center of the base 102.

Also, four linear guides 112 are disposed on the base 102, and each of the rails 110 on the two pairs of holding fixtures 105, 106 and 107, 108 is guided in the radial direction by means of the corresponding linear guide 112. By this means, the two pairs of the holding fixtures 105, 106 and 107, 108 can move linearly in the radial direction on the base 102.

Further, each of the holding fixture pairs 105, 106 or 107, 108 are configured in such a way that they are moved together in unison on the base by a holding fixture linkage mechanism such that when one of the holding fixtures 105 or 107 is moved outward by a rack and pinion or pulley and a linkage belt, etc., the other holding fixture 106 or 108 is linked to move away from the one holding fixture and such that when the holding fixtures 105, 107 are moved toward the inside, the other holding fixtures 106, 108 are linked to move toward the inside.

Figure 7:
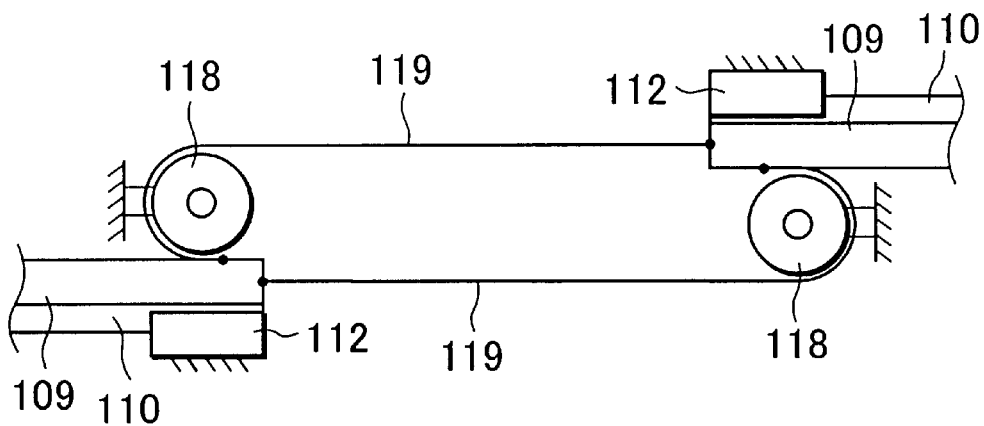
FIG. 7 is a diagram for explaining a holding fixture linking mechanism of the holding device in FIG. 5.

FIG. 7 shows an example of a holding fixture linkage mechanism. The support rods 109 of the respective holding fixture pairs 105, 106 and 107, 108 are linked to each other by a linkage belt 119 passed through pulleys 118 anchored to the base 102. By this means, when the holding fixture 105 or 107 of one pair of holding fixtures moves, the other holding fixture 106 or 108 is linked to move symmetrically to the holding fixture 105 or 107.

A contact part 113 that extends parallel to a line normal to the plane of movement (surface of base 102) of the two pairs of holding fixtures 105, 106 and 107, 108 is formed on the inside end of each holding rod 111 of the two pairs of holding fixtures and comes in contact with the object to be held when holding the object. The structure of the contact part 113 is described in detail later.

The holding device 101 has a holding fixture release mechanism that continually forces each pair of the holding fixtures 105, 106 and 107, 108 apart from each other and a holding fixture drive mechanism that drives them toward each other when holding an object to be held. Thus, the holding fixture release mechanism and holding fixture drive mechanism act to release and hold the object being held, respectively.

Figure 6:
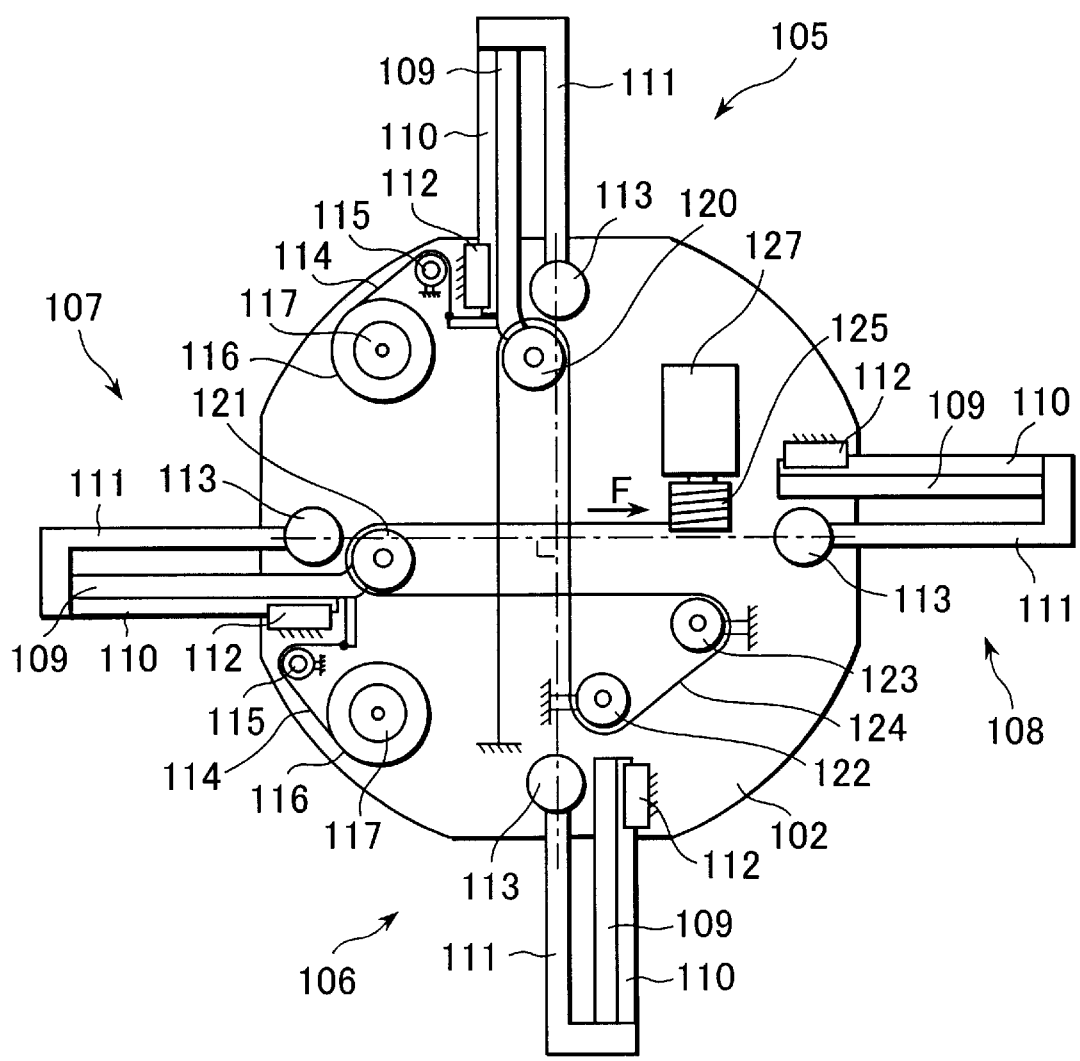
FIG. 6 is diagram for explaining a holding fixture release mechanism and a holding fixture drive mechanism of the holding device in FIG. 5.

First is an explanation of the holding fixture release mechanism. In FIG. 6, one end of a release rope 114 is attached to the respective support rods 109 on the holding fixtures 105, 107, and the other end is wound around a release rope take-up drum 116 via a pulley 115. The release rope take-up drum 116 is energized to turn in the take-up direction (counterclockwise direction in FIG. 6) by a spiral spring 117 disposed coaxially with the drum 116.

Since the release rope take-up drum 116 is continually energized in the direction that takes up the release rope 114 by means of this holding fixture release mechanism, one holding fixture 105 or 107 of one pair is energized toward the outside in the radial direction of the base 102 by the release rope 114, and the other holding fixture 106 or 108 of the one pair is similarly energized toward the outside in the radial direction from the center of the base 102 via the holding fixture linkage mechanism. That is, the holding fixtures 105 and 106 or 107 and 108 that constitute one pair are continually energized in the direction in which they move away from each other.

Next is an explanation of the holding fixture drive mechanism. Holding fixture pulleys 120, 121 are disposed on the above holding fixtures 105, 107, respectively, of the two pairs of holding fixtures 105, 106 and 107, 108. Also, frame pulleys 122, 123 are disposed on the base 102. A single drive rope 124 is passed through the holding fixture pulleys 120, 121 and frame pulleys 122, 123, with one end being attached to a drive rope take-up drum 125 and the other end being attached to the base 102.

The drive rope take-up drum 125 is rotated by a motor 127 capable of forward and reverse operation in such a way that it can take-up or unwind the drive rope 124.

One distinctive feature of the configuration of this invention is to provide a rotating mechanism that enables at least one of the contact parts of the multiple pairs of holding fixtures that come in contact with the object to be held, to be rotated around an axis parallel to a line normal to the plane of movement of the multiple pairs of holding fixtures to maintain a rolling contact with the object.

Figure 8:
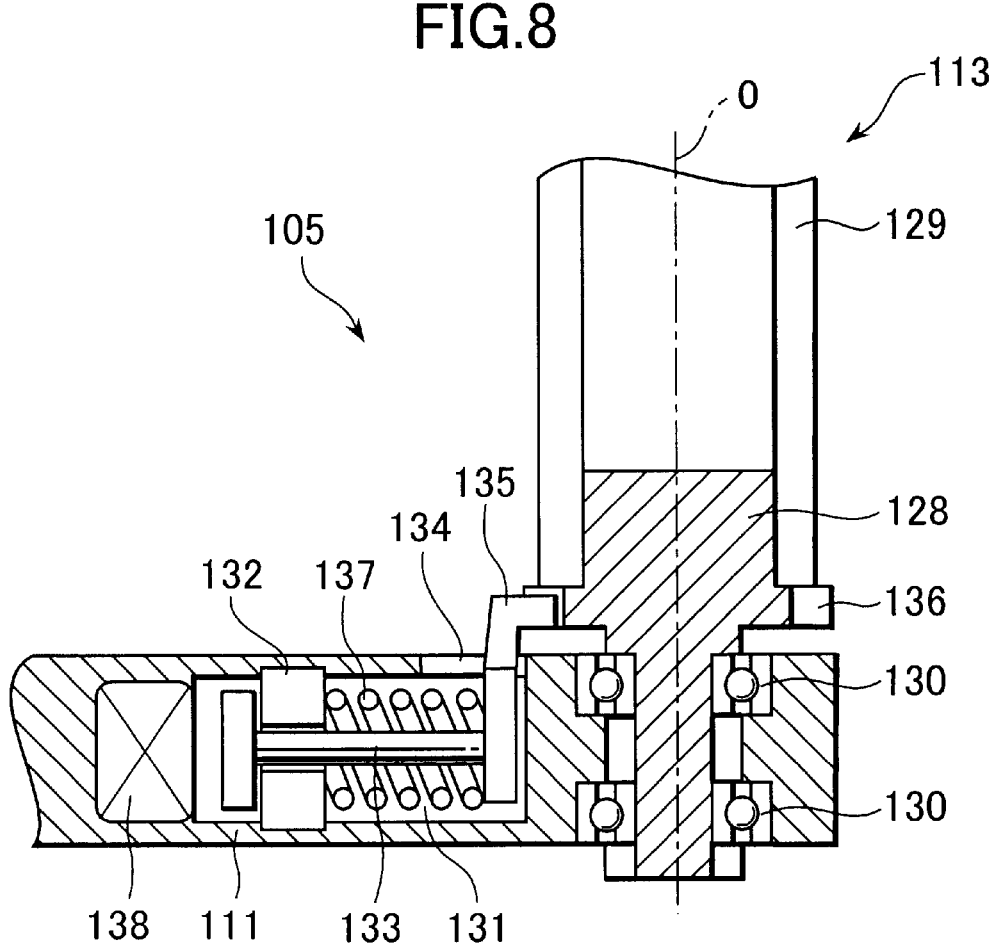
FIG. 8 is a diagram for explaining an example of the holding fixture braking means of the holding device of this invention.
Figure 9A:
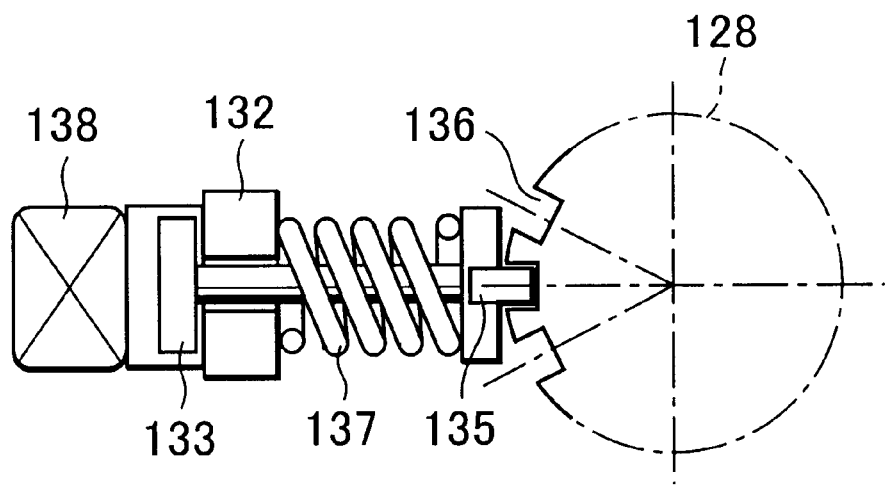
FIG. 9(*a*) is a diagram for explaining the condition wherein the braking means in FIG. 8 has stopped rotation of the contact part.
Figure 9B:
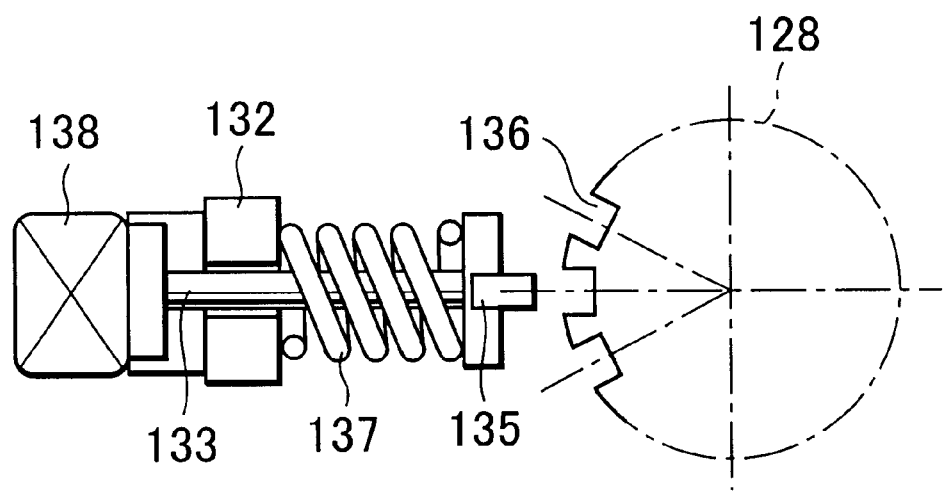
Figure 10:
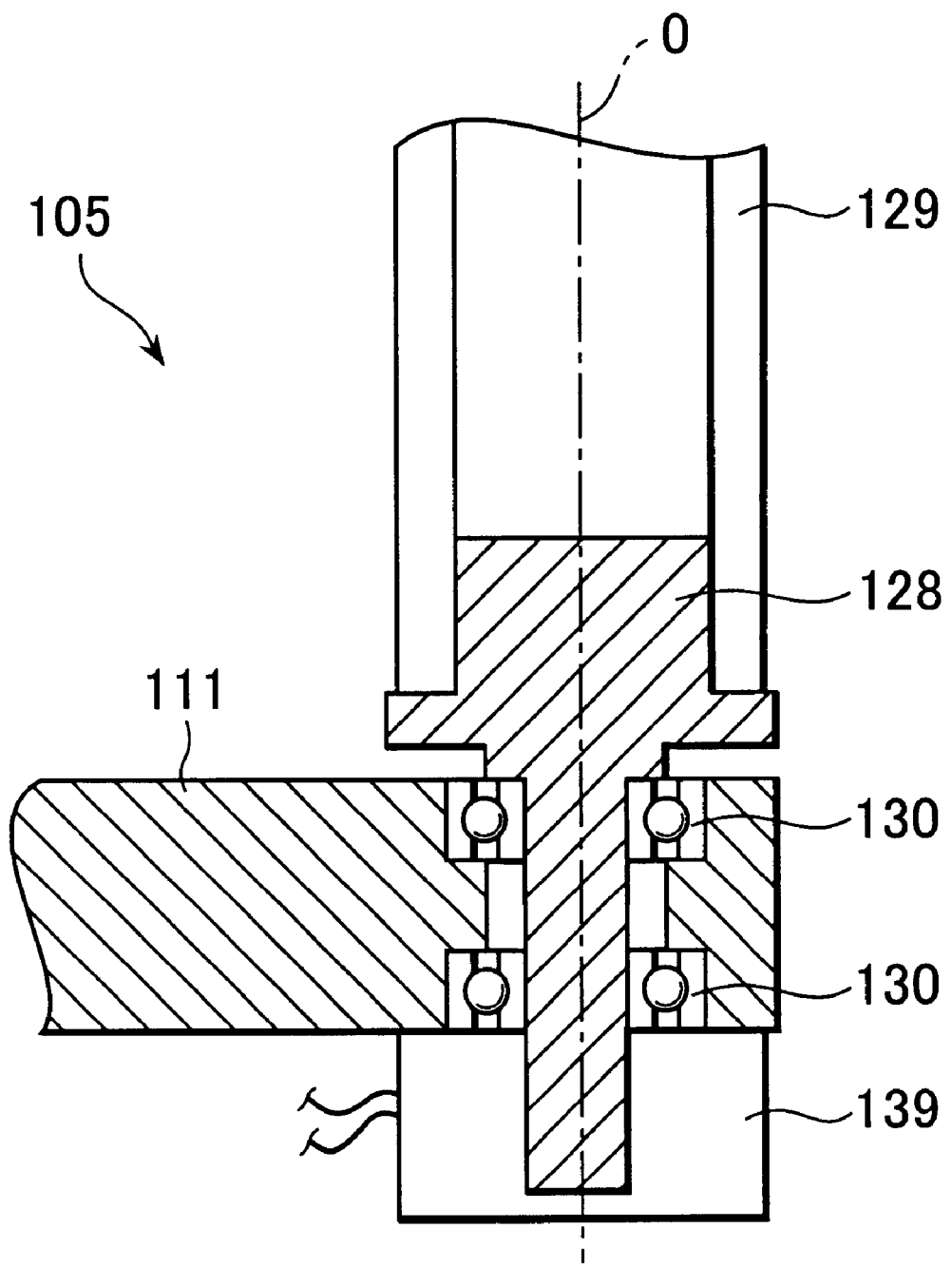
FIG. 10 is a diagram for explaining another example of the holding fixture braking means of the holding device of this invention.

In this embodiment, the contact parts 113 that come in contact with and hold the object to be held are disposed on the respective inside ends of the two pairs of holding fixtures 105, 106 and 107, 108 as described above, but at least one of these contact parts 113 is disposed such that it can rotate in order to maintain a rolling contact with the object around an axis parallel to a line normal to the plane of movement of the two pairs of holding fixtures by means of a rotation mechanism as shown in FIG. 8 to FIG. 10.

In FIG. 8, the contact part 113 comprises a support shaft 128 and a contact member 129 (cylinder in this embodiment) fitted on the support shaft. The support shaft 128 is attached to the inside end in the radial direction of each holding rod 111 of the holding fixtures 105, 106, 107, 108 (shown in FIG. 8 is 105 only, but the same is applied to other holding fixtures 106, 107, 108) via bearings 130 such that it can rotate about the center O.

Since the contact member 129 is fitted on the support shaft 128, the contact part 113 is capable of rotating about the axis O of the support shaft 128, thus allowing a rolling contact with the object to be held when holding the object.

In this embodiment, as described above, the contact part 113 can rotate about the axis O of the support shaft 128 and come in rolling contact with the object to be held when holding the object, but various embodiments with specific configurations other than that described above are possible as long as the contact part 113 is capable of rotating around an axis parallel to a line normal to the plane of movement of the two pairs of holding fixtures 105, 106 and 107, 108 when holding the object...

Another feature of this invention is to provide a braking means for restricting the rotation of the contact part 113. The braking means of this invention can constrain rotation of the contact part or adjust the rotation resistance, and two examples of this braking means are explained with reference to FIG. 8 to FIG. 10.

FIG. 8 and FIG. 9 show a braking means with a braking function that stops or allows the rotation of the contact part 113. In FIG. 8, the support rod 111 has a hollow portion 131, and a braking means 133 capable of sliding on a sliding bearing 132 is disposed in this hollow portion 131. A braking claw 135 protruding outside through a long hole 134 from the hollow portion 131 in the holding rod 111 is formed on one end of the braking means 133. A number of braking holes 136 are disposed at intervals on the outside surface of the support shaft 128 and are configured such that the braking claw 135 can engage in and disengage from the braking hole 136.

As shown in FIG. 8 and FIG. 9(a), one end (on the right side in each figure) of the braking means 133 is continually pushed by a compression coil spring 137, thus causing the braking claw 135 to engage in one of the braking holes 136 to brake the rotation of the contact part 113. An electromagnet 138 is disposed at one end of the hollow portion 131, and as shown in FIG. 9(b), by operating this electromagnet 138, the braking means 133 is pulled toward one end (on the left side in figure) of the hollow portion 131 against the force of the compression coil spring 137. This causes the braking claw 135 to disengage from the braking hole 136 in the support shaft 128 and allow the contact part 113 to rotate.

FIG. 10 shows a configuration wherein a braking means is disposed on one end of the support shaft 128. More specifically, an electromagnetic brake 139 is disposed on one end of the holding rod 111 as a braking means, and electromagnetic braking is applied to the one end of the support shaft 128 by the electromagnetic brake. An electromagnetic force or electroviscous fluid is used to select rotation or non-rotation, and by adding a continuously variable braking function to the braking means, the magnitude of braking force can be adjusted.

In this invention, the contact part 113 disposed on at least one of the holding fixtures of the multiple pairs of holding fixtures (two paired, i.e., four, holding fixtures in the embodiment shown in the figures) is capable of rotating in order to maintain a rolling contact with the object to be held. Embodiments in this case are shown below.

(1) A configuration where all of the holding fixtures can rotate freely.

(2) A configuration where one holding fixture of each of the multiple pairs of holding fixtures can rotate freely.

(3) A configuration where all of the holding fixtures can rotate and all or some of the holding fixtures are equipped with braking means.

Below is an explanation of the operation of the holding device 101 of an embodiment of this invention configured as described above and shown in FIG. 5 and FIG. 6. Since the release rope 114 is continually being energized in the take-up direction on the release rope take-up drum 116 by the spring force of the spiral spring 117, the two pairs of holding fixtures 105, 106 and 107, 108 are energized in the radial direction that is a direction separating them from each other, whereby the two pairs of holding fixtures 105, 106 and 107, 108 are in a release condition.

When the motor 127 turns the drive rope take-up drum 125 in the take-up direction by an electrical signal that instructs holding of the object to be held, the drive rope take-up drum 125 takes up the drive rope 124 and pulls the drive rope 124 in the direction of arrow F. When this happens, a force is applied to the holding fixture pulleys 120, 121, whereby the holding fixtures 105, 107 move in a direction that holds the object to be held against the take-up force of the spiral spring 117, while at the same time the holding fixtures 106, 108 are moved symmetrically by the same operation via the holding fixture linkage mechanism, resulting in the contact parts disposed on the inside end of the holding fixtures holding the object.

When releasing the held object, an electric signal for hold-releasing causes the above motor 127 to rotate in the direction opposite from that shown above, whereby the drive rope taken up by the drive rope take-up drum 125 is unwound and loosened. This allows the release rope take-up drum 116 to take up the release rope 114 by means of the take-up force of the spiral spring 117, and the action of the holding fixture linkage mechanism causes the above two pairs of the holding fixtures 105, 106 and 107, 108 to move radially outward from each other, thus releasing the object.

In this invention, the contact part 113 that has already been in contact with the object to be held during operation of the two pairs of holding fixtures 105, 106 and 107, 108 makes a smooth transition to a more stable holding condition by means of the rolling contact.

When the object to be held is being held by the contact part 113 of the holding fixture equipped with a braking means like that shown in FIG. 8 and FIG. 9, the braking claw 135 of the braking means 133 continually engages in one of the braking holes 136 in the support shaft 128 as shown in FIG. 8 and FIG. 9(a), thus stopping rotation of the contact part 113.

However, by operating the electromagnet 138, the braking means 133 is pulled toward one end (on the left side in figure) of the hollow portion 131 against the spring force of the compression coil spring 137. By this means, as shown in FIG. 9(b), the braking claw 135 disengages from the braking hole 136 in the support shaft 128, thus allowing the contact part 113 to rotate.

By utilizing this rotation-braking and brake-releasing function that allows rotation during the holding operation and constrains rotation after holding is completed, the contact part 113 that has already been in contact with the object to be held can achieve a smooth transition to a stable holding condition and secure maintenance of the stable holding condition.

Even in a case wherein an object to be held is held by the contact part 113 of the holding fixture equipped with a breaking means such as that shown in FIG. 10, rolling contact with the object is made possible during the holding operation, and after holding is complete, rotation can be constrained by applying a braking force to one end of the support shaft 128 by means of the electromagnetic brake 139, whereby a transition to a stable holding condition is achieved while preventing slip, and that holding condition can be securely maintained after holding is complete. Further, when a variable braking function is added, diverse holding conditions where the amount of rotation in rolling contact is changed by adjusting the braking force can be attained to accommodate various types and attributes of objects.

If all of the contact parts of all the holding fixtures were allowed to rotate freely and two parallel surfaces of an object were to be held, the rolling contact between the contact parts and the object would make it impossible to constrain translational movement in a direction parallel to the surfaces of the object, or if a columnar or cylindrical object were to be held so that its axis was parallel to the rotation axis of the holding fixture, the condition would result in that some rotation around the axis of the object could not be constrained, which could cause problems depending on the operation.

However, this invention adopts a configuration wherein the contact parts of some of the holding fixtures are fixed or a configuration wherein a braking means is used to select rotation or non-rotation of the contact parts and to allow adjustment of the constraining condition of the contact parts, whereby simultaneous rotation of all of the contact parts is prevented to solve the above problems.

The holding force of the holding device 101 of this invention is determined by the torque of the motor 127 and spring force of the spiral spring 117, but by designing the spring characteristic of the spiral spring so that the recovery force remains roughly constant regardless of displacement, the force applied by each holding fixture on the object to be held can be made equal regardless of any difference in open width between the two pairs of holding fixtures.

Detailed description of control of the rotation amount and torque of the motor 127 has been omitted because it is not directly related to the subject matter of this invention. However, detection signals from a potentiometer or encoder that detects the rotation amount of the motor 127, a holding pressure detection device disposed on the holding fixtures or other known detection device (not shown) may be used to detect the location of the holding fixtures or the holding condition, whereby the amount of rotation or torque of the motor is controlled.

The above embodiment is one example of a specific configuration of this invention, and the essential purpose of the invention is to offer a simple, lightweight and compact holding device wherein multiple holding fixtures are moved simultaneously by means of a single drive source and a rope driven by the drive source to perform a holding action and realize uniform, stable holding. It goes without saying that various specific configurations can be adopted within the scope of this essential purpose.

The holding device of this invention has been described based on one embodiment, but the invention is not limited to this embodiment, and can be embodied in various forms within the scope of the technical points of the appended claims.

By means of the holding device of this invention, which can be made simple, lightweight and compact, it is possible to perform a holding action by moving multiple holding fixtures simultaneously by means of a single drive source and a rope driven by this drive source and to realize precise, stable holding of an object to be held since the holding force of all the holding fixtures is uniform.

One particular feature of this invention is that the holding force of the holding features is uniform regardless of the shape of the object to be held, thus making it extremely useful as a holding device in manufacturing operations where workpieces of various shapes must be held, as a hand on helper robots that must hold various daily use objects and in automated food manufacturing equipment that needs to hold soft foods.

Further, since the contact part of at least one of the holding fixtures is capable of rotating in order to maintain a rolling contact with an object to be held in this invention, slip that occurs between the object and the holding fixtures during the holding operation is reduced as compared to when none of the contact parts is capable of rotating, thus achieving a smooth transition to a stable holding condition while preventing dropping etc. of the object due to an unstable holding condition caused by the slip. Also, by providing some contact parts not capable of rotating, it is possible to prevent occurrence of a condition wherein constraint is not possible.

Further, by providing the holding fixtures with a braking means in this invention, free rotation during the holding operation is possible while rotation after holding is complete can be constrained, and the rotation braking condition during the holding operation can be adjusted. Therefore, it is possible to achieve a smooth transition to a stable holding condition and constrain the object to be held after holding is complete, while also making it possible to precisely control the holding operation to accommodate various types and various attributes of objects to be held.

What is claimed is:

1. A holding device comprising:

a support frame;

first and second pairs of holding fixtures mounted on the support frame;

a holding fixture pulley attached to one holding fixture of said first pair of holding fixtures and to one holding fixtures of said second pair of holding fixtures;

at least one frame pulley attached to the support frame;

a drive rope bridging the holding fixture pulley and the frame pulley and having one end pulled in one direction and an opposite other end fixed to the support frame;

a drive source for pulling the drive rope such that when the drive rope is pulled by the drive source, said first and second pair of holding fixtures are linked to move symmetrically with respect to each other in a direction for holding an article, said first pair of holding fixtures move independently of said second pair of holding fixtures, and each said first and second pair of holding fixtures are movable toward and away from each other on one of a straight line and on two parallel straight lines on a plane of the support frame;

wherein the first and second pairs of holding fixtures have contact parts that contact the article when the article is being held, and at least one of the contact parts is disposed so as to be rotatable about an axis parallel to a line normal to the plane of the support frame to maintain a rolling contact with the article when holding the article; and a braking device for enabling at least one of a constraint of rotation and an adjustment of rotation resistance of said at least one of the contact parts after gripping of the article.

2. The holding device of claim 1, further comprising a holding device connected to each of said first and second multiple pairs of holding fixtures mounted on the support frame for holding articles of various shapes.

3. The holding device of claim 1, further comprising a device for smoothly guiding an article into a stable holding condition that is determined by at least one of a shape of the article to be held and an initial position of the article relative to the holding device.

4. The holding device of claim 1, further comprising a device for stabilizing an article during a transition phase by braking the rotational force of the contact parts.

* * * * *